G. E. CHAMBERLAIN.
CAN FILLING MACHINE.
APPLICATION FILED SEPT. 22, 1905.

901,420.

Patented Oct. 20, 1908.
6 SHEETS—SHEET 1.

Fig. 1.

WITNESSES:
G. A. Pennington
Fred F. Reisner

INVENTOR
George E. Chamberlain,
BY
Carr & Carr,
ATTORNEYS.

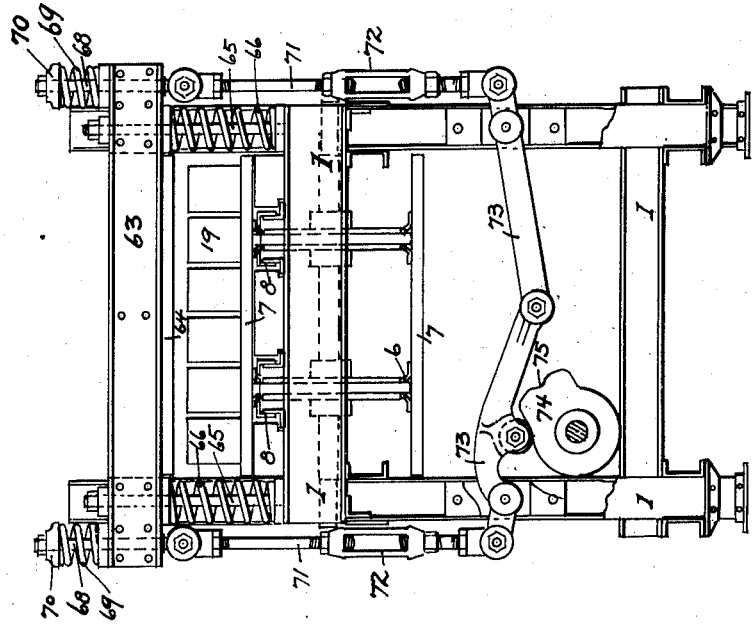

G. E. CHAMBERLAIN.
CAN FILLING MACHINE.
APPLICATION FILED SEPT. 22, 1905.
901,420.
Patented Oct. 20, 1908.
6 SHEETS—SHEET 3.
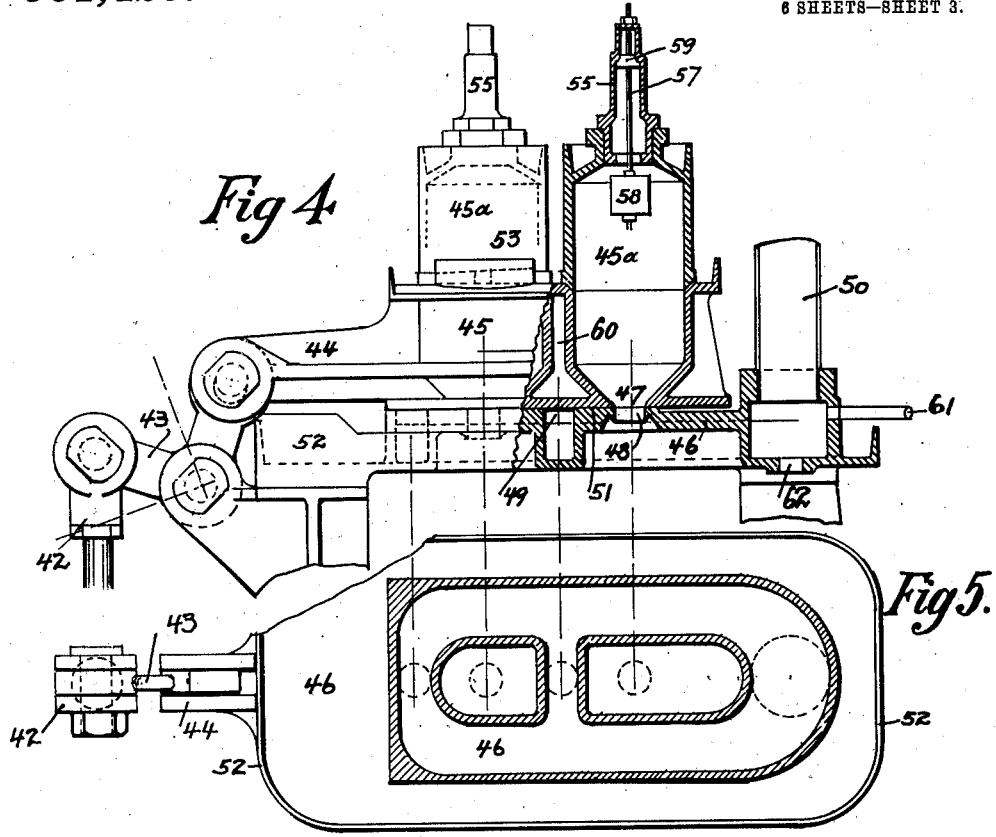
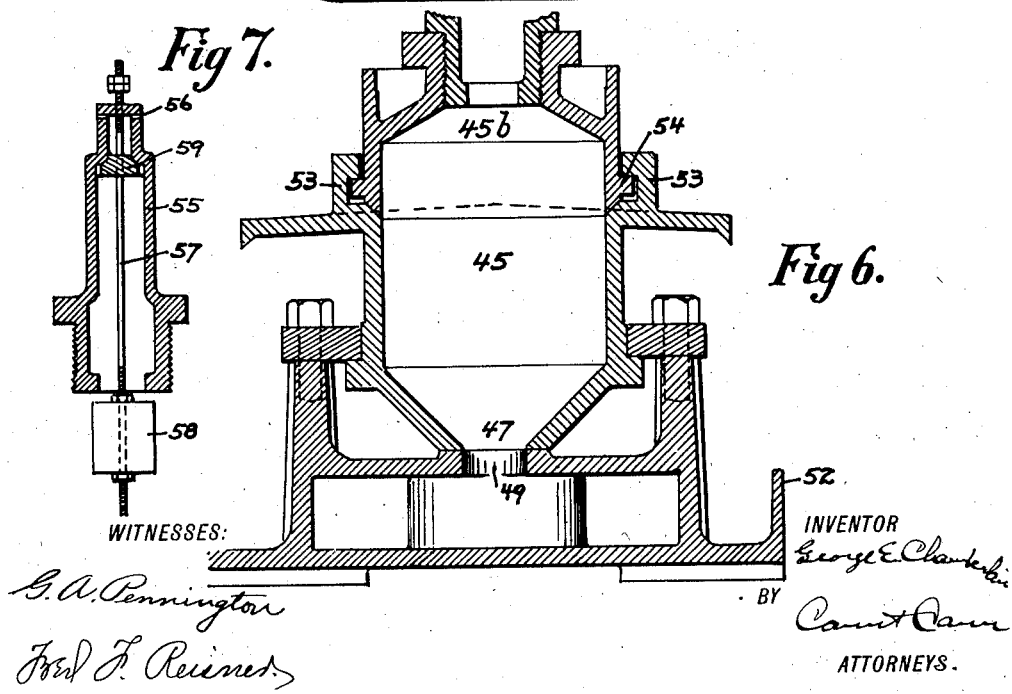
WITNESSES:
INVENTOR
George E. Chamberlain
BY
ATTORNEYS.

G. E. CHAMBERLAIN.
CAN FILLING MACHINE.
APPLICATION FILED SEPT. 22, 1905.
901,420.
Patented Oct. 20, 1908.
6 SHEETS—SHEET 4.
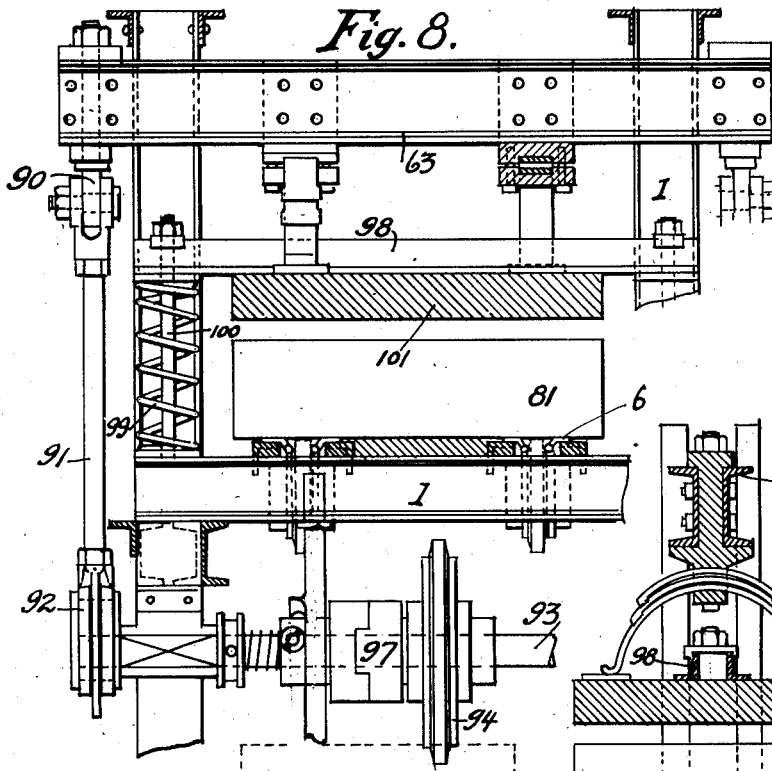
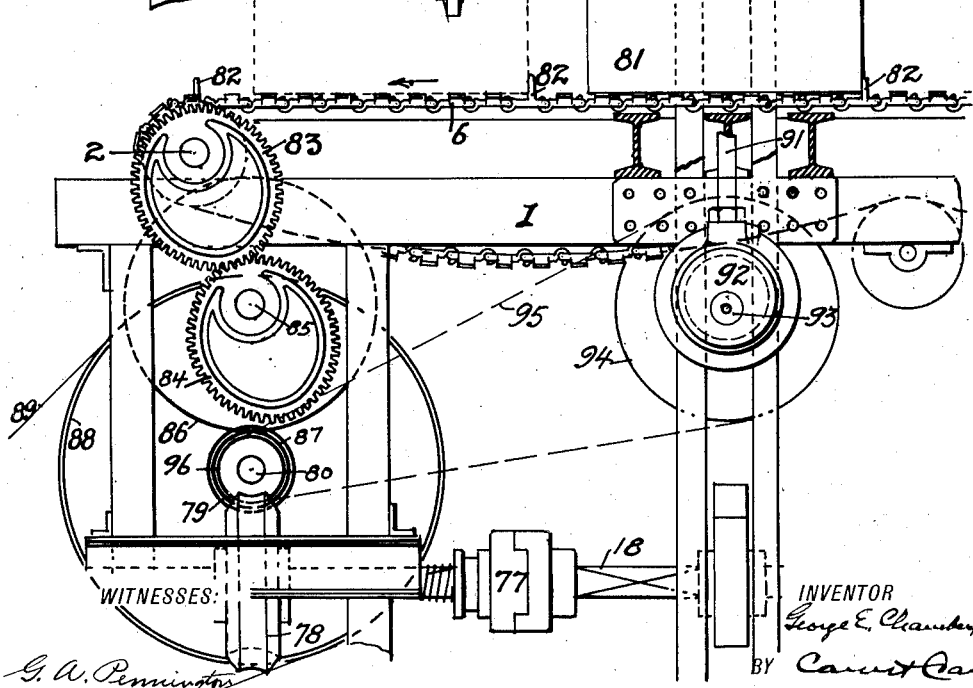
WITNESSES:
INVENTOR
George E. Chamberlain
BY
ATTORNEYS

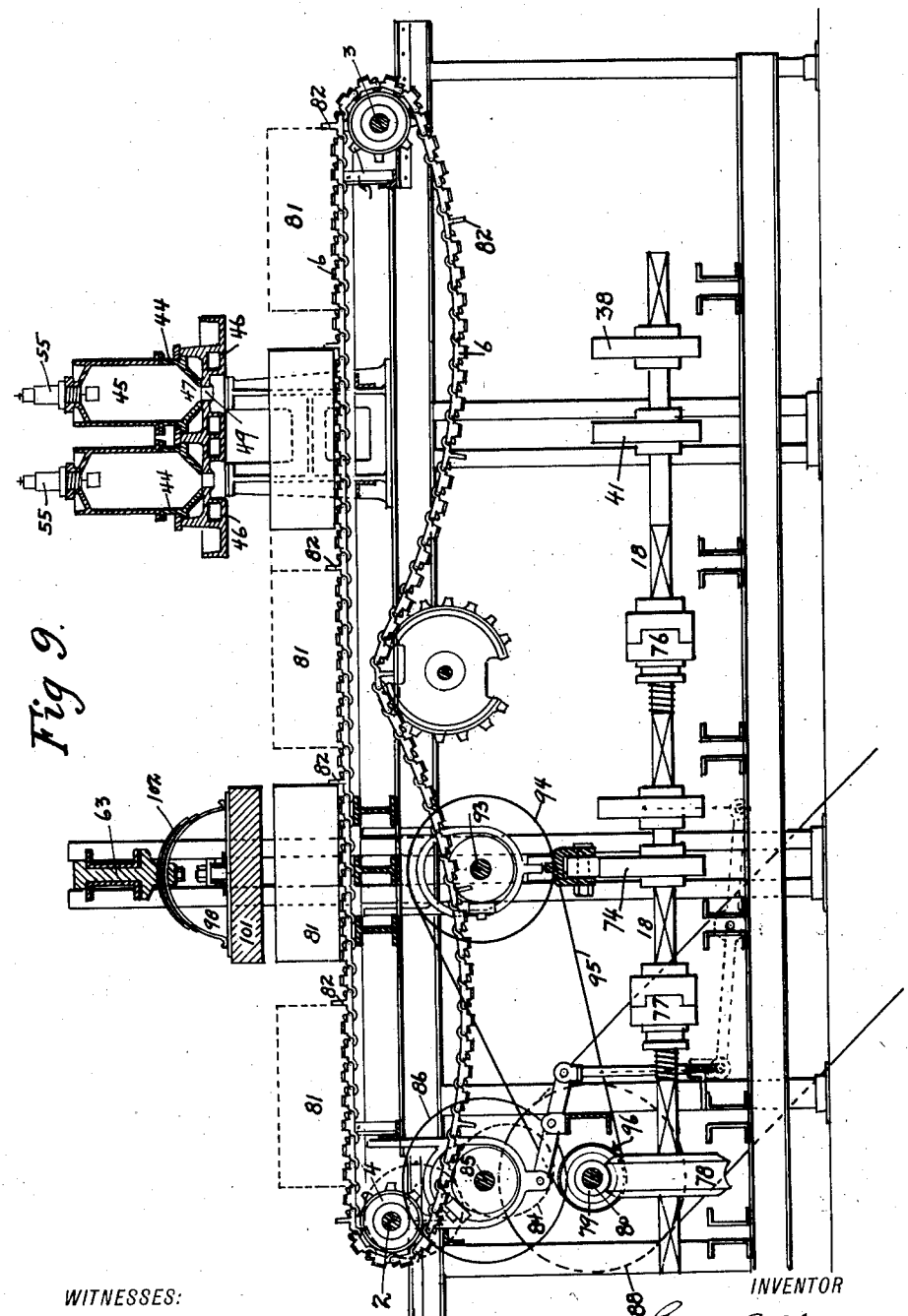

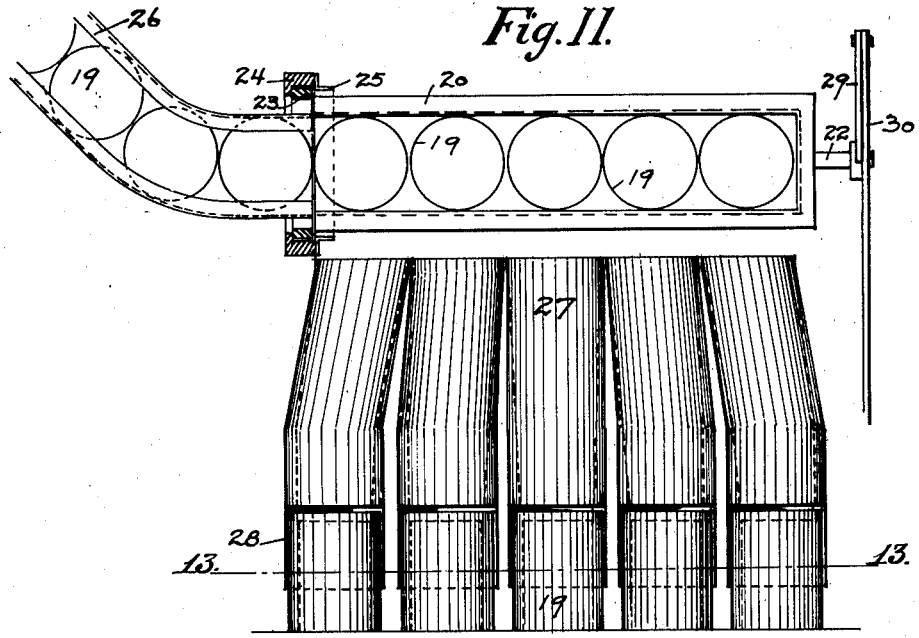
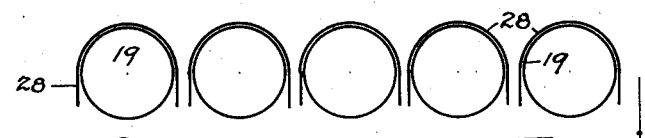
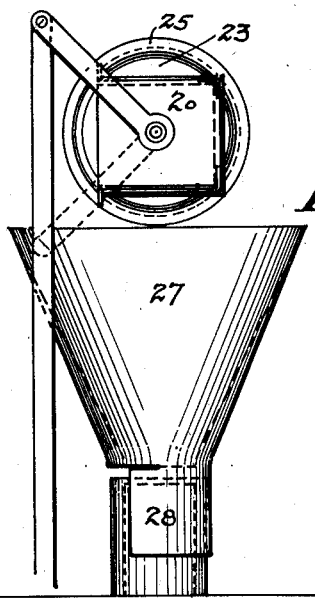

UNITED STATES PATENT OFFICE.

GEORGE E. CHAMBERLAIN, OF ST. LOUIS, MISSOURI.

CAN-FILLING MACHINE.

No. 901,420.  Specification of Letters Patent.  Patented Oct. 20, 1908.

Application filed September 22, 1905. Serial No. 279,594.

*To all whom it may concern:*

Be it known that I, GEORGE E. CHAMBERLAIN, a citizen of the United States, and a resident of the city of St. Louis and State of Missouri, have invented a new and useful Improvement in Can-Filling Machines, of which the following is a specification.

My invention relates to can filling machines and has for its principal objects to provide for the feeding and positioning of the cans; to provide for the delivery thereto of the desired quantities of liquid; to provide for the automatic cutting off of the liquid supply when the desired amount of liquid is delivered; to avoid splashing of the liquid out of the cans; to provide for the proper capping of the cans; to provide for the cleaning of the apparatus; and to secure other advantages hereinafter set forth.

My invention consists in the construction and in the arrangements and combinations of parts hereinafter described and claimed.

In the accompanying drawing which forms part of this application and wherein like symbols refer to like parts wherever they occur, Figure 1 is a longitudinal elevation of my machine; Fig. 2 is an end elevation showing the liquid feeding mechanism, mounted on the main frame, but with the other parts of the machine removed; Fig. 3 is an elevation showing a capping mechanism mounted on the main frame, but with the other parts of the machine removed; Fig. 4 is a vertical detail partly sectional of the measuring vessels and of the filling mechanism; Fig. 5 is a horizontal sectional view of the hollow base of the filling mechanism; Fig. 6 is a vertical cross-sectional detail through one of the measuring vessels and the base of the filling mechanism; Fig. 7 is a detail of the air vent of the measuring vessel; Fig. 8 is a vertical sectional view taken crosswise of the machine showing the can capping device adapted for capping a plurality of rows of cans; and, Fig. 9 is a view of the same device taken in section lengthwise; Fig. 10 is a detail elevation showing a modification of the feeding device, the upper part of the figure being a longitudinal vertical section; Fig. 11 is a detail elevation of the can feeding device looking longitudinally of the machine; Fig. 12 is an elevation of the can feeding device looking transversely of the machine; Fig. 13 is a horizontal section on the line 13—13 of Fig. 11.

My machine comprises an elongated frame 1 built up of channel bars or of other suitable construction. Near the respective ends of this frame are journaled shafts 2, 3 upon which are mounted sprocket wheels 4, 5 which coöperate with sprocket chains 6, the links of the chains being connected together by cross bars or slats 7 so as to constitute a movable platform or conveyer. In order to prevent sagging of the conveyer a level bed or platform 8 is mounted on the main frame immediately below the upper or going section of the conveyer.

Motion is intermittently communicated to the conveyer by any suitable means, as for instance, by the device shown in the drawing. As illustrated in the drawing (see Fig. 1) a ratchet wheel 9 is fixed to the same shaft 2 which carries the sprocket wheels 4, and loosely mounted on this shaft is an arm 10 upon which is pivotally mounted a pawl 11 arranged to engage the ratchet teeth of said wheel 9. This pawl is connected by an adjustable link 12 to one end of a lever 13 which is fulcrumed on a part 14 fixed to the base or frame of the machine and whose other end is connected by an adjustable link 15 to a lever 16 which bears against the edge of a cam 17 on the main shaft 18 of the machine. By this arrangement each revolution of the main shaft causes the cam 17 thereon to operate the lever 16 whose motion is transmitted through the intermediate devices to the pawl 11 and thence to the shaft of the sprocket wheels of the conveyer. The conveyer is thus fed forwardly intermittently or step by step, each step being slightly greater in length than the width of a can.

The cans are delivered automatically to the conveyer by can feeding mechanism. Arranged transversely across and above the end of the machine is a rotatable cage or skeleton frame 20 having a cross-section corresponding to that of the cans. The ends of this case are journaled in supports provided therefor on the frame of the machine. In order to journal the cage, one of its ends is closed and provided with an ordinary spindle or axle 22 that swivels in the support provided therefor. The other end of the cage or skeleton frame, however, is open and for this reason the cage is provided at this end with an outwardly projecting flange or rib 23 of circular contour and the support 24 therefor is a hollow hub adapted for the circular flange to turn in and having a part 25 overhanging and interlocking with the circular flange 23. The cage or skeleton frame is a hollow three sided box whose fourth side and one end are open, and whose cross-sectional area is slightly larger than the central longitudinal sectional area of a can. In alinement with and directly opposite the open end of the cage is the end of a can chute 26 which extends upwardly at an inclination to a hopper (not shown) or other source of supply. This chute is of proper size for the cans to fit loosely, so that they may roll freely down the same. When the cage is in its normal horizontal position, its inner contour coincides or registers with the inner contour of the chute, so that the cans in the chute are free to roll into the cage, which is proportioned to receive a certain number of cans. When the cage is turned so that its inner contour passes out of register with the inner contour of the chute the end wall and flange of the cage obstruct the end of the chute so that the cans in the chute at the time are held therein. When the cage is turned a certain distance from its normal position the cans therein dump into hoppers 27 provided therefor immediately below the cage. The transverse width of these hoppers is slightly greater than the width of the cans, while their width measured longitudinally of the machine is considerably larger than the width of the can at the upper portion from which they taper downwardly to a diameter slightly more than that of the can with which they are used. At their bottoms these hoppers terminate in semi-cylindrical extensions 28 whose sides extend tangentially forward parallel with the direction of movement of the conveyer.

The feeding movement of the can cage is effected by the driving mechanism through suitable connections. For instance, as shown in Fig. 1, the axle 22 is provided with an arm 29 which is connected by a link 30 to the end of a lever 31 fulcrumed on the framework. Connected to an intermediate portion of this lever is a second link 32 which in turn is pivotally connected to one end of a lever 33 which is fulcrumed in a portion 34 of the framework and has a link 35 connecting it to a lever 36 which is fulcrumed in a support 37 fixed to the framework. This lever 36 is arranged to coöperate with a cam 38 fixed to the driving shaft 18. These intermediate connecting devices are so proportioned that for each revolution of the cam the cage is turned a quarter of a revolution to dump the cans therein into the respective hoppers. A second cam or other suitable device returns the cage to its normal position in which its end is open to permit the cans in the supply chute to roll into and recharge the cage.

In order to render the device applicable for feeding and positioning cans of different widths the cage 20 may be made removable so as to be replaceable with another cage of proper size for the cans to be used therewith. So, too, the hoppers 27 are arranged to be contractile at their lower ends whereby they may be adjusted to the proper size for coöperating with the cans.

As stated above, the lever 33 is intermittently actuated by the driving shaft through intermediate connecting devices. As stated above, one end of this lever is connected through intermediate connecting devices to the can cage 20 to transmit motion thereto. The other end of said lever is connected by a link 39 to a lever 40 fulcrumed in the main frame, and this lever 40 carries an anti-friction wheel which coöperates with a cam 41 on the driving shaft 18. This lever 40 is also connected to an adjustable link 42 of a bell crank lever 43 fulcrumed in the main frame and is connected to the slide 44 which carries the liquid measuring cups 45. The contact portions of the end surface of this slide and of the upper surface of the base piece 46 upon which it rests are accurately finished so as to prevent leakage between them. The slide 44 comprises one or more rows of cups arranged transversely of the machine, that is, in the direction of movement of the slide. Each of the cups has a hole in its bottom and its upper end is arranged to be closed automatically when the liquid reaches a certain level, as hereinafter described. The base upon which the slide moves has a thick plate or casting having perforations 48 arranged to register with the holes 47 in the bottoms of the measuring cups 45 when the slide is at one limit of its motion. In order to prevent the dripping of the liquid where it is not desired, the space surrounding the holes 48 is counterbored and bosses or circular projections are formed on the underside of the base for the holes 48 to extend through and these bosses or projections are beveled on their outer edges. The upper surface of the base has holes or channels 49 formed therein in position for the holes in the bottom of the measuring cups to register with when the slide is at the opposite limit of its stroke. These holes or channels are in direct communication through the supply pipe 50 with the supply tank which contains the syrup or other liquid to be delivered to the cans. The portion 51 in the upper surface of the base between the edge of the opening 48 and the opening or channel 49 therein is slightly greater than the diameter of the opening 47 in the measuring cup, so that when the slide is midway of its stroke, the measuring cup does not communicate with either of said openings. The margin of the base is provided with an upwardly extending flange 52 to catch any liquid that may get on said plate.

In order to vary the capacity of a cup, its upper portion is made separable from its lower portion. For this reason, the slide which contains the lower portion is provided with lugs 53 arranged on diametrically opposite sides of each hole. These lugs extend upwardly and have inwardly overhanging portions whose end surfaces are inclined like a screw thread or helix. The upper portion 45$^a$ of the measuring tank has its lower end beveled to fit the beveled upper edge of the lower member and is provided with outwardly extending lugs 54 whose upper surfaces are inclined to coöperate with the lugs 53 on the slide or lower member. By this arrangement, the lugs on the upper member may be engaged with those of the lower member and the two parts tightly fitted together by turning the upper member. The capacity of the cup is changed by removing the upper portion 45$^a$ and replacing it with another similar portion 45$^b$ of the desired capacity. Thus, by making the upper members interchangeable with each other on the same base, the volume of the liquid delivered may be varied at pleasure.

In order to cut off the supply of liquid when a desired volume has been delivered into the measuring cup, the upper member of the measuring cup is provided with an automatic float valve. In the upper end of the top portion of the measuring cup is a threaded hole into which fits a threaded shell 55 whose upper end has air vents or holes 56 extending therethrough. Through the top end of this shell extends a rod 57 whose lower end reaches down into the cup and is there provided with a float 58. Near the upper end of the shell, its cross section is contracted or offset, and the offset portion is beveled to form a valve seat for a valve 59 carried by the stem. The portion of the stem extending outside of the shell is provided with a nut. In operation, when the cup is empty, the weight of the valve and connected parts causes the same to hang over the top of the projecting shell; but when the liquid in the cup rises, it lifts the float which in turn carries with it the stem and the valve 59, so that as soon as the valve is seated, it prevents the further escape of the air and thereby prevents the further admission of the liquid into the cup.

As the device is particularly adapted for use with syrups and other viscous fluids, it is desirable to form chambers 60 in the casting which constitutes the lower members of the cups and to connect such chambers to the steam supply so as to heat the liquid in the cups and thereby reduce its viscosity and the probability of its interfering with the action of the air vent. It is to be noted in this connection that the shell which carries the seat of the air valve is of considerable length in order to prevent the spattering of the liquid from interfering with the action of the valve. The case of the filling device is also connected by a pipe 61 to a source of steam supply so that the base may be readily cleaned; this casting is likewise provided with a suitable drain hole 62 to facilitate its cleaning.

When the cans have been filled with liquid, the conveyer carries them forward step by step, and the operator or attendant places a cap in the top opening of each can. The cans are carried by the conveyer beneath the capping device, which sets the caps firmly in place. The capping device comprises a beam or cross-piece 63 extending transversely above the conveyer and preferably having a wooden block 64 arranged to bear downwardly against the caps of the cans. This cross-piece 63 is mounted on suitable guide pieces so as to be free to move vertically. As shown in Fig. 3, the guides consist of upright bolts 65 fixed to the frame of the machine and extending through holes in the cross-piece 63. Helical springs 66 surround these upright bolts and bear at their lower ends against the framework and at their upper ends against the cross-piece 63 so as to normally keep said cross-piece high enough to prevent any obstruction to the movement of the cans 19 on the conveyer. The ends of the upright bolts are preferably threaded and provided with nuts 67 to prevent the cross-piece moving too high. The projecting ends of the cross-piece have vertical holes therein through which extend pins 68. Helical springs 69 surround the upper ends of these pins and bear at their lower ends against the cross-piece and at their upper ends against nuts or washers 70 provided therefor on the pins. The lower ends of the pins are connected by sectional links 71 (whose sections are joined together by turn-buckles 72) to levers 73 fulcrumed on the framework and pivotally connected to each other by means of a bolt mounted on one of said levers and extending through an elongated slot in the other. One of said levers 73 is provided with an anti-friction roller between its fulcrum and its point of connection to the other lever. This anti-friction roller is located to coöperate with the edge of a cam 74 provided therefor on the driving shaft. This last mentioned cam is circular throughout the greater portion of its periphery but has an eccentric projection which has a slight depression 75 near the middle of its angular width. By this arrangement, the cam causes a downward movement of the cross-piece once for each revolution of the shaft, but, instead of the cross-piece being held at its lowermost position, it is allowed to rise a very short distance and then move downwardly again to its lowermost position and is then lifted to its initial normal position. The purpose of this duplex can capping movement is to insure the proper fitting of the cap which a single movement does not always accomplish. The downward movement of the capper block 64 is regulated by adjusting the turnbuckles 72.

It is desirable to arrange the machine so that the operation of the filling device can be discontinued without affecting the operation of capping of the cans already filled. For this reason, the driving shaft 18 is made in sections connected together by means of a clutch 76 located between the cams which effect the operation of the filling device and of the capping device, respectively. A second clutch 77 is located between the cam of the capping device and the source of power. Motion is transmitted to the driving shaft 18 by any suitable connecting device. As shown in Fig. 1, the shaft 18 carries a worm gear 78 which meshes with a worm 79 mounted on a shaft 80.

Figs. 8, 9 and 10 show a modification of the machine designed particularly for handling cans in boxes. In this modification, the step-by-step feed of the conveyer is somewhat greater than the width of the box 81 which contains a plurality of rows of cans. It is noted that the can filling device is also modified so as to have one measuring cup for each can and arranged in proper position to deliver liquid into the can. In this modification, the cross bars of the conveyer may be dispensed with and the boxes rest directly upon the chains 6, certain links of which are provided with projecting shoulders 82 to insure the proper positioning of the boxes. On account of the great length of the feeding movement of the conveyer, it is desirable to provide for the rapid movement thereof without, however, causing the liquid to slop over. For this purpose, the driving shaft 2 of the conveyer chain 6 is provided with an eccentric elliptic gear 83 which meshes with an eccentric gear 84 mounted on a shaft 85 to which is fixed a gear 86 on a clutch sleeve which meshes with the gear 87 on the shaft 80 which in turn carries a belt wheel 88 over which passes a driving belt 89. By this arrangement, the feeding movement starts slowly and ends slowly, but its intermediate portion is rapid.

As shown in Fig. 8, the cross-piece 63 of the capping device has pins 90 connected by links 91 to eccentrics 92 on a shaft 93 arranged transversely in the main frame and carrying a sprocket wheel 94 on a clutch sleeve 97 connected by a sprocket chain 95 to a sprocket wheel 96 on the shaft 80. This shaft 93 is provided with an ordinary disengaging clutch sleeve 97. Below the first-mentioned cross-piece 63 is a second cross-piece 98 which is normally held in its uppermost position by means of helical springs 99. These springs 99 surround guide pieces 100 which extend vertically up from the framework through said last mentioned cross-piece 98. This last mentioned cross-piece 98 is provided with a block 101 of proper size to bear against all of the caps of a box filled with cans simultaneously and on the top of said block bear elliptic springs 102 which are secured to the first mentioned cross-piece 63. By this arrangement, the helical springs keep the capping block normally high enough for the box to clear; but during the capping operation the eccentric acting through its links pulls down the cross-piece 63 whose motion is transmitted from the elliptic springs to the capper block 101.

Obviously, my machine admits of considerable modification without departing from my invention and I do not wish to restrict myself to the specific construction hereinbefore described. So, too, it is obvious that other containers may be used as well as cans.

What I claim as my invention and desire to secure by Letters Patent is:

1. A filling machine comprising a chambered base having vertical holes therethrough, a slide fitting on said base and having measuring cups open at their bottoms and having float actuated air valves, and mechanism for intermittently shifting said slide to make the openings at the bottoms of the cups register alternately with the respective chambers and holes in the base.

2. A filling machine comprising a chambered base having vertical holes therethrough, a slide fitting on said base and having measuring cups open at their bottoms and having float actuated air valves, and mechanism for intermittently shifting said slide to make the openings at the bottoms of the cups register alternately with the respective chambers and holes in the base, said slide having chambers around the lower portion of said measuring cups arranged to communicate with a source of steam.

3. A filling machine comprising a chambered base arranged to communicate with a source of liquid supply and said base having holes extending vertically therethrough and an outlet drain and a pipe connecting its chambers to a source of steam, a slide fitting on said base and having measuring cups open at their bottoms and having float actuated air valves, a mechanism for intermittently shifting said slide to make the openings at the bottoms of the cups register alternately with the respective chambers and holes in the base.

4. A can feeding device comprising a horizontal cage open at one side and one end and rotatably mounted, and funnels below said cage, a conveyer below said funnels, and an inclined chute whose end registers with the open end of the cage.

5. A can feeding device comprising a horizontal cage open at one side and one end and rotatably mounted, and funnels below said cage, a conveyer below said funnels, and an inclined chute whose end registers with the open end of the cage, the lower ends of the funnels extending almost to the conveyer and being open on one side to the height of a can.

6. A can feeding device comprising a horizontal cage open at one side and one end and rotatably mounted, a series of adjustable funnels below said cage, a conveyer below said funnels and an inclined chute whose end registers with the open end of the cage.

7. A can feeding device comprising a horizontal cage open at one side and one end and rotatably mounted and a series of funnels below said cage and a chute registering with the open end of said cage.

8. A filling machine comprising a horizontally movable conveyer, a plurality of can filling devices arranged transversely above said conveyer, and a device above said conveyer for capping cans thereon, said capping device comprising a cross piece having spring pressed rods extending therethrough at its ends and connected by links to actuating levers, and separate springs arranged near the ends of said cross piece to support the same.

9. A filling machine comprising a horizontally movable conveyer, a plurality of can filling devices arranged transversely above said conveyer, and a device above said conveyer for capping cans thereon, said capping device comprising a cross piece having spring pressed rods extending therethrough at its ends and connected by adjustable links to actuating levers, and separate springs arranged near the ends of said cross piece to support the same.

10. A filling machine comprising a device for filling cans, a device for capping them, and a device for feeding the cans to said filling device and said capping device successively, said capping device comprising a spring supported cross-piece having spring pressed rods extending therethrough and connected by links to cam-actuated levers, a cam for actuating said lever having a depression in its eccentric portion.

11. A filling machine comprising a device for filling cans, a device for capping cans, and a horizontal conveyer adapted to carry cans from said filling device to said capping device, said capping device comprising a spring supported cross-piece having rods extending vertically through its projecting ends and springs interposed between said cross-piece and the heads provided therefor on the upper ends of said rods, the lower ends of said rods being connected by links to levers fulcrumed in the framework and connected to each other by a pin and slot connection, and a cam on the driving shaft arranged to coöperate with one of said levers and having a depression in its eccentric portion.

12. A filling machine comprising a horizontal conveyer belt and mechanism for actuating the same, mechanism for delivering cans onto said conveyer belt in transverse rows, a plurality of devices for delivering measured quantities of liquid into the respective cans of a row on said conveyer belt, and mechanism for capping a row of cans on said conveyer belt.

13. A filling machine comprising a horizontal conveyer belt, mechanism for actuating the same, mechanism for delivering cans onto said conveyer belt in a transverse row, a plurality of devices for delivering measured quantities of liquid into the respective cans of a row, and mechanism for capping the row of cans on said conveyer belt, said can delivering mechanism, said liquid delivering devices and said capping mechanism being all operatively connected to the driving mechanism, and means for disconnecting the same therefrom.

GEORGE E. CHAMBERLAIN.

Witnesses:
J. B. MEGOWN,
JAMES A. CARR.